(12) United States Patent
Goodyear et al.

(10) Patent No.: US 10,925,105 B2
(45) Date of Patent: Feb. 16, 2021

(54) HYBRID SYSTEM LOCAL AREA NETWORK

(71) Applicant: BANK OF AMERICA CORPORATION, Charlotte, NC (US)

(72) Inventors: Todd Michael Goodyear, New Hope, PA (US); Jisoo Lee, Cortlandt Manor, NY (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 16/428,271

(22) Filed: May 31, 2019

(65) Prior Publication Data
US 2020/0196368 A1 Jun. 18, 2020

Related U.S. Application Data

(60) Provisional application No. 62/778,504, filed on Dec. 12, 2018.

(51) Int. Cl.
H04W 76/16 (2018.01)
H04W 88/04 (2009.01)
H04W 4/70 (2018.01)
H04L 12/715 (2013.01)

(52) U.S. Cl.
CPC ............ H04W 76/16 (2018.02); H04W 4/70 (2018.02); H04W 88/04 (2013.01); H04L 45/04 (2013.01)

(58) Field of Classification Search
None
See application file for complete search history.

(56) References Cited

U.S. PATENT DOCUMENTS

| 7,810,148 | B2 | 10/2010 | Ben-Shachar et al. |
| 7,926,089 | B2 | 4/2011 | Tulshibagwale et al. |
| 8,291,468 | B1 | 10/2012 | Chickering |
| 8,677,451 | B1 | 3/2014 | Bhimaraju et al. |
| 8,687,640 | B2 | 4/2014 | Lyons et al. |
| 9,087,189 | B1 | 7/2015 | Koeten et al. |
| 9,231,904 | B2 | 1/2016 | Johnson et al. |
| 9,432,359 | B2 | 8/2016 | Menezes et al. |
| 9,906,568 | B2 | 2/2018 | Whynot et al. |
| 9,917,861 | B2 | 3/2018 | Frahim et al. |
| 9,935,930 | B2 | 4/2018 | Chen |
| 10,237,253 | B2 | 3/2019 | Chen |
| 10,430,606 | B1 | 10/2019 | Levit et al. |
| 10,455,387 | B2 | 10/2019 | Nicholson et al. |
| 10,484,877 | B2 | 11/2019 | Zhang |
| 10,560,485 | B2 | 2/2020 | Lawson et al. |
| 10,601,810 | B2 | 3/2020 | Chen |
| 10,637,724 | B2 | 4/2020 | Johnson et al. |

(Continued)

Primary Examiner — Anh Ngoc M Nguyen
(74) Attorney, Agent, or Firm — Michael A. Springs; Moore & Van Allen PLLC; Nicholas C. Russell

(57) ABSTRACT

An electronic system is typically configured for crawling, via a machine learning model, into one or more API servers, wherein the one or more API servers comprise one or more versions of one or more APIs, capturing, via the machine learning model, information associated with the one or more versions of the one or more APIs, creating context objects associated with each of the one or more versions of the one or more APIs, receiving a real-time API request from a client system, processing the real-time API request received from the client system, and routing the real-time API request to an API version of the one or more versions.

17 Claims, 3 Drawing Sheets

(56) References Cited

U.S. PATENT DOCUMENTS

| | | |
|---|---|---|
| 2004/0255167 A1 | 12/2004 | Knight |
| 2012/0291090 A1 | 11/2012 | Srinivasan et al. |
| 2016/0241988 A1* | 8/2016 | Slevin ................. H04Q 9/00 |
| 2017/0264974 A1 | 9/2017 | Harrison |
| 2018/0054468 A1 | 2/2018 | Whynot et al. |
| 2018/0092142 A1* | 3/2018 | Han ................. H04W 36/38 |
| 2019/0150071 A1* | 5/2019 | Lee ................. H04W 36/08 |
| | | 370/328 |
| 2019/0297538 A1 | 9/2019 | Keller et al. |
| 2020/0068414 A1* | 2/2020 | Karimli ............... H04J 3/0647 |

* cited by examiner

HYBRID SYSTEM LOCAL AREA NETWORK

CROSS-REFERENCE TO RELATED APPLICATIONS

This application claims the benefit of U.S. Provisional Patent Application Ser. No. 62/778,504, filed Dec. 12, 2018 entitled "Hybrid Enterprise Local Area Network," the entirety of which is incorporated herein by reference.

BACKGROUND

In the wireless communication context, the use of conventional wireless technology to accomplish an entity's objectives presents a number of technological challenges. For example, an entity using a wireless connection may experience periods of low throughput and/or high latency, which may negatively affect the entity's operations. Accordingly, there is a need for a more effective system for using an advanced wireless technology within the entity.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for enabling communication between 5G enabled devices and non-5G enabled devices. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the system is configured to establish a first connection with at least one 5G enabled device, establish a second connection with at least one non-5G enabled device, receive an input from the at least one 5G enabled device, and route the input received from the at least one 5G enabled device to a recipient, wherein the recipient is at least one of a third party device or the at least one non-5G enabled device.

In some embodiments, the system routes the input based on identifying a type of the input, wherein identifying the type of the input comprises determining the recipient of the input.

In some embodiments, the system determines that the input is an inbound communication based on determining the recipient of the input and routes the input to the at least one non-5G enabled device. In some embodiments, routing the input comprises transmitting data associated with the input to the at least one non-5G enabled device by enabling peer to peer communication between the at least one 5G enabled device and the at least one non-5G enabled device.

In some embodiments, the system determines that the input is an outbound communication based on determining the recipient of the input and routes the input to the third party device, wherein the third party device is a public cloud server.

In some embodiments, the input is associated with an action that is to be performed by the recipient.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
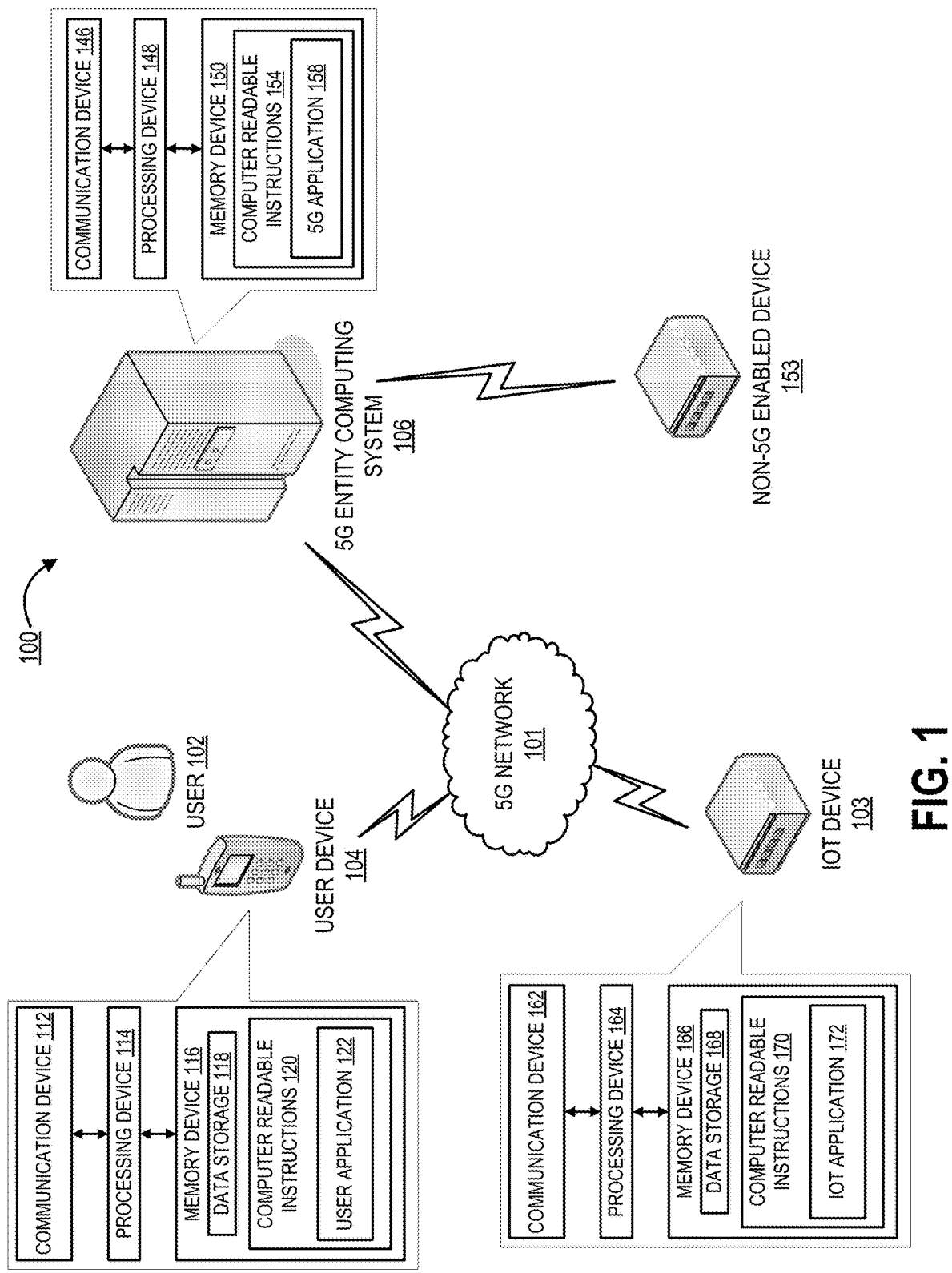
Figure 2:
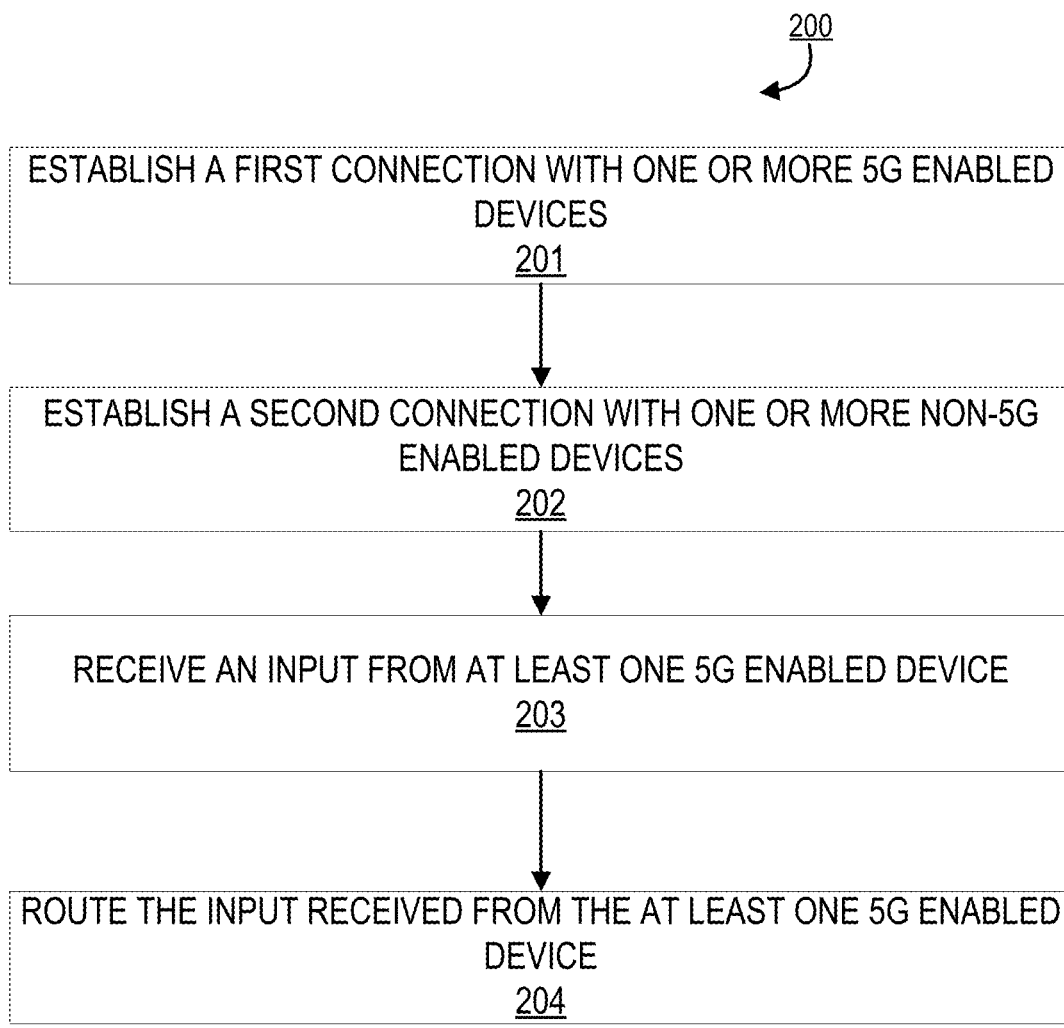
Figure 3:
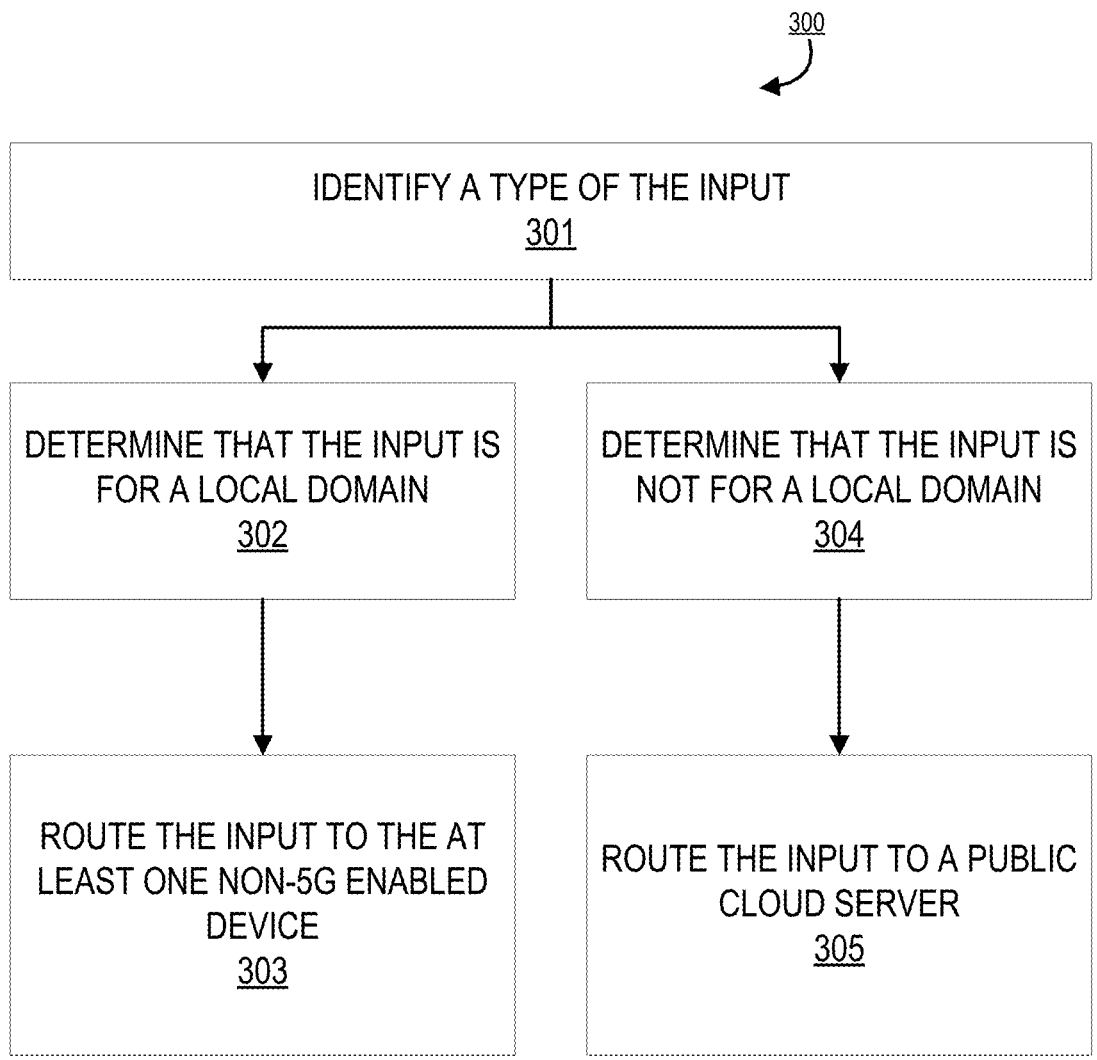

Having thus described embodiments of the invention in general terms, reference will now be made to the accompanying drawings, wherein:

FIG. 1 provides an operating environment for enabling communication between 5G enabled devices and non-5G enabled devices, in accordance with one embodiment of the present invention;

FIG. 2 provides a process flow for enabling communication between 5G enabled devices and non-5G enabled devices, in accordance with one embodiment of the present invention; and FIG. 3 provides a process flow 300 for routing the input received from the at least one 5G enabled device to at least one non-5G enabled device, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, individual organization, and the like, which may routinely use various types of applications within its enterprise environment to accomplish its objectives. In some embodiments, the system of the present invention may be applicable to an individual household instead of an entity, which comprises 5G enabled devices and non-5G enabled devices.

"Entity system" as used herein may refer to the computing systems, devices, software, applications, communications hardware, and/or other resources used by the entity to perform location-based data management. Accordingly, the entity system may comprise 5G cellular networks (e.g., 5G towers, transmitters, receivers, or the like), blockchain database servers, Internet-of-Things ("IoT") devices, networked terminals, mobile smartphones, smart devices (e.g., smart watches), and/or other types of computing systems or devices along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Service" as used herein includes any task, labor, product, or the like provided to a user from a third party service provider that may include a company, individual, or the like.

"Transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

With the improvement in 5G technology, the entity's are migrating to 5G network and currently only specific devices have the capability to connect to the 5G network. There are a large number of devices that do not have the capability to connect to the 5G network and thereby making communication between the 5G enabled devices and non-5G enabled devices a challenging process. Typically, for a 5G enabled device to communicate with a non-5G enabled device, the communication signals have to go through a headend, where the headend acts as a control center that receives all types of communication signals from different types of devices and routes the communication signals to other devices. The communication signals are typically routed by the headend in an orderly fashion and based upon the number of communication signals received by the headend, there may be a delay in routing the communications signals to respective devices, thereby decreasing the efficiency of communication between devices. For example, an internal communication signal associated with local domain will also have to go through a headend result in inefficient communication. Therefore, there are no systems that currently enable efficient communication between 5G enabled devices and non-5G enabled devices. As such, there exists a system which facilitates a hybrid platform that routes the communication received from the 5G enabled devices to non-5G enabled devices. The system of the present invention provides a hybrid platform that enables creation of a hybrid system Local Area Network which allows the 5G enabled devices and non-5G enabled devices to communicate with each other.

Turning now to the figures, FIG. 1 illustrates an operating environment 100 for an entity 5G system, in accordance with one embodiment of the present invention. In particular, FIG. 1 illustrates a 5G entity computing system 106 that is operatively coupled, via a 5G network 101 to a user device 104 and/or an IoT device 103. In such a configuration, the 5G entity computing system 106 may transmit information to and receive information from the user device 104 and/or the IoT device 103. The 5G entity computing system 106 may be connected to a non-5G enabled device 153, where the 5G entity computing system 106 enables the user device 104 and/or the IoT device 103 that are connected to the 5G network 101 to communicate with the non-5G enabled device 153. It should be understood that FIG. 1 illustrates only an exemplary embodiment of the system environment 100, and it will be appreciated that in other embodiments one or more functions of the systems, devices, or servers as depicted in FIG. 1 may be combined into a single system, device, or server. In other embodiments, a single system, device, or server as depicted in FIG. 1 may represent multiple systems, devices, or servers.

The 5G network 101 may be a system specific distributive network receiving and distributing specific network feeds and identifying specific network associated triggers. The 5G network 101 include one or more 5G radio towers, antennae, cell sites, base stations, telephone networks, cloud networks, radio access networks (RAN), WiFi networks, or the like. Additionally, the 5G network 101 may also include a global area network (GAN), such as the Internet, a wide area network (WAN), a local area network (LAN), or any other type of network or combination of networks. Accordingly, the 5G network 101 may provide for wireline, wireless, or a combination wireline and wireless communication between devices on the 5G network 101.

The 5G network 101 as described herein confers many technological benefits over conventional network systems. For instance, the 5G network 101 may support network slicing to allow cellular service providers to generate virtualized cellular networks on a per-device basis, with each virtualized cellular network having certain defined features and performance standards. As a result, an entity may tailor the 5G network 101 to certain devices which may require higher bandwidth and/or lower latency connections than is available from conventional networks. Accordingly, the 5G network 101 may improve the efficiency and/or effectiveness of various processes in multiple different scenarios and use cases, as will be further described herein.

The user device 104 may be operated by a user 102. The user device 104 may be, for example, a portable device such as a cellular phone, smart phone, personal data assistant (PDA), laptop, or the like, though it is within the scope of the disclosure for the user device 104 to be a stationary device such as a desktop computer. The user device 104 generally comprises a communication device 112, a processing device 114, and a memory device 116. The processing device 114 is operatively coupled to the communication device 112 and the memory device 116. The processing device 114 uses the communication device 112 to communicate with the 5G network 101 and other devices on the 5G network 101, such as, but not limited to the 5G entity computing system 106. As such, the communication device 112 generally comprises a modem, antennae, WiFi or Ethernet adapter, radio transceiver, or other device for communicating with other devices on the 5G network 101.

The user device 104 comprises computer-readable instructions 120 and data storage 118 stored in the memory device 116, which in one embodiment includes the computer-readable instructions 120 of a user application 122. In some embodiments, the user application 122 allows a user 102 to receive communications from and/or send communications to the 5G entity computing system 106.

As further illustrated in FIG. 1, the 5G entity computing system 106 may comprise a communication device 146, a processing device 148, and a memory device 150. The 5G entity computing system 106 may be owned and/or operated by an entity such as a cellular service provider, financial institution, business organization, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the 5G network 101 and other devices on the 5G network 101, such as, but not limited to the user device 104 and/or the IoT device 103. Generally comprises a modem, antennae, WiFi or Ethernet adapter, radio transceiver, or other device for communicating with other devices on the 5G network 101.

As further illustrated in FIG. 1, the 5G entity computing system 106 comprises computer-readable instructions 154 stored in the memory device 150, which in one embodiment includes the computer-readable instructions 154 of a 5G application 158. In some embodiments, the memory device 150 includes data storage 152 for storing data related to the system environment, but not limited to data created and/or used by the 5G application 158. The 5G application 158 may comprise computer-executable program code which may instruct the processing device 148 to perform certain logic, data processing, and data storing functions of the application to accomplish the entity's objectives. For example, the 5G application 158 may allow the entity to query, track, configure, or perform other types of communicative functions with the user device 104 and/or the IoT device 103.

In some embodiments, the operating environment may comprise one or more IoT devices 103. The IoT device 103 may refer to an appliance, vehicle, computing accessory, wearable device, or other type of smart device which may support 5G connectivity. Accordingly, the IoT device 103 may also comprise a processing device 164 operatively coupled to the communication device 162 and a memory device 166 comprising data storage 168 and computer readable instructions 170. The computer readable instructions 170 may comprise an IoT application 172 which may be configured to instruct the processing device 164 to execute certain functions over the 5G network 101, such as interacting with the 5G entity computing system 106 and/or the user device 104.

The communication device 162, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the IoT device 103 may also include a communication interface device that may be connected by a hardwire connection to the resource distribution device. The interface device may comprise a connector such as a USB, SATA, PATA, SAS or other data connector for transmitting data to and from the IoT device 103.

The user device 104 and the IoT device 103 may each further include a processing device communicably coupled to devices as a memory device, output devices, input devices, a network interface, a power source, a clock or other timer, a camera, a positioning system device, a gyroscopic device, one or more chips, and the like.

In some embodiments, the user device 104 and the IoT device 103 access one or more databases or datastores (not shown) to search for and/or retrieve information related to the service provided by the entity. The user device 104 and the IoT device 103 may also or alternatively access both a memory and/or datastore local to the user device 104 and/or the IoT device 103.

The processing devices as described herein may include functionality to operate one or more software programs or applications, which may be stored in the memory device. For example, a processing device may be capable of operating a connectivity program, such as a web browser application. In this way, the user device 104 and/or the IoT device 103 may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the user device 104 and/or the IoT device 103. Alternatively, the applications may be pre-installed and stored in a memory in a chip.

The chip may include the necessary circuitry to provide 5G support and/or integration within the user device 104 and the IoT device 103. Generally, the chip will include data storage which may include data associated with the service that the user device 104 and the IoT device 103 may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the user device 104 and the IoT device 103. For instance, the functionality of the chip may be incorporated within the memory device and/or the processing device. In a particular embodiment, the functionality of the chip is incorporated in an element within the user device 104 and the IoT device 103. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the user device 104 and/or the IoT device 103 may be configured to operate with one or more air interface standards, communication protocols, modulation types, and access types. By way of illustration, the user device 104 and/or the IoT device 103 may be configured to operate in accordance with any of a number of first, second, third, fourth, and/or fifth-generation communication protocols and/or the like. For example, the user device 104 and/or the IoT device 103 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The user device 104 and/or the IoT device 103 may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The user device 104 and/or the IoT device 103 may have an interface that includes user output devices and/or input devices. The output devices may include a display (e.g., a liquid crystal display (LCD) or the like) and a speaker or other audio device, which are operatively coupled to the processing device. The input devices, which may allow the user device 104 and/or the IoT device 103 to receive data from a user and/or service provider, may include any of a number of devices allowing the user device 104 and/or the IoT device 103 to receive data from a user and/or the service provider, such as a keypad, keyboard, touch-screen, touchpad, microphone, mouse, joystick, other pointer device, button, soft key, and/or other input device(s).

The user device 104 and/or the IoT device 103 may further include a power source. Generally, the power source is a device that supplies electrical energy to an electrical load. In some embodiment, power source may convert a form of energy such as solar energy, chemical energy, mechanical energy, or the like to electrical energy. Generally, the power source in a user device 104 and/or the IoT device 103 may be a battery, such as a lithium battery, a nickel-metal hydride battery, or the like, that is used for powering various circuits, e.g., the transceiver circuit, and other devices that are used to operate the user device 104 and/or the IoT device 103. Alternatively, the power source may be a power adapter that can connect a power supply from a power outlet to the user device 104 and/or the IoT device 103. In such embodiments, a power adapter may be classified as a power source "in" the user device 104 and/or the IoT device 103.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the user device 104 and/or the IoT device 103 described herein.

The user device 104 and/or the IoT device 103 further comprises a gyroscopic device. The positioning system, input device, and the gyroscopic device may be used in correlation to identify phases within a service term.

In some embodiments, the user device 104 and/or the IoT device 103 may identify the activity associated with a service. The user device 104 and/or the IoT device 103 may do this via the gyroscopic device, positioning system device, camera, and the like. As such, the user device 104 and/or the IoT device 103 may identify when a product is being used, how often it is being used, the phase of the service, and the like.

As described above, the IoT device 103 may be one or more of various types of "smart devices." For example, the IoT device 103 may be a machine such as an automobile, tractor trailer, airplane, manufacturing device, warehouse devices, material handling system, conveyor system, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of IoT devices 103 or smart devices provided herein is not exhaustive such that the IoT device 103 may be any device that includes a communication interface or module, software and/or hardware that allow the device to communicate data and/or information related to the device with other devices and/or systems over network.

The IoT device 103 may also have a control system for controlling the physical operation of the device. The control system may comprise one or more sensors for detecting operating conditions of the various mechanical and electrical systems that comprise the IoT device 103 or of the environment in which the IoT device 103 is used. The sensors may communicate with the processing device to provide feedback to the operating systems of the device. The control system may also comprise metering devices for measuring performance characteristics of the IoT device 103. The control system may also comprise controllers such as programmable logic controllers (PLC), proportional integral derivative controllers (PID) or other machine controllers. The IoT device 103 may also comprise various electrical, mechanical, hydraulic or other systems that perform various functions of the IoT device 103. These systems may comprise, for example, electrical circuits, motors, compressors, or any system that enables functioning of the IoT device 103.

FIG. 2 provides a process flow 200 for enabling communication between 5G enabled devices and non-5G enabled devices, in accordance with embodiments of the present invention. The system of the present invention provides a hybrid platform that creates a hybrid system local area network, where the one or more devices within an entity communicate with each other via the hybrid system local area network. The one or more devices may include 5G enabled devices that connect to a 5G network and non-5G enabled devices that are unable to connect to the 5G network.

As shown in block 201, the system establishes a first connection with one or more 5G enabled devices. 5G enabled devices may be laptops, phones, tablets, servers, computer terminals, or the like that have a special inbuilt technology that allows them to connect to a 5G network. In some embodiments, the 5G enabled devices may include IoT devices.

As shown in block 202, the system establishes a second connection at least one non-5G enabled device. The non-5G enabled devices may be existing devices in an entity such as printers, fax machines, laptops, phones, servers, or the like that do not have the capability to connect to a 5G network.

As shown in block 203, the system receives an input from the at least one 5G enabled device. The input may any type of communication signal. In some embodiments, the communication signal may be an outbound communication. In some embodiments, the communication signal may be an inbound communication, where the inbound communication is associated with the local domain (i.e., devices within the entity). In some embodiments, the input may be associated with an action that is to performed by the at least one non-5G enabled device. For example, the system may receive a print job from a 5G enabled laptop. In some embodiments, the input may be data transfer job or the like.

As shown in block 204, the system routes the input received from the at least one 5G enabled device to a recipient. In some embodiments, recipient information is present in the input received from the at least one 5G enabled device. The process of routing one or more inputs is explained in detail in FIG. 3. In some embodiments, the input may be an inbound communication, where the input is to be transferred to a non-5G enabled device. In some embodiments, the system may receive an input that is directed towards a specific non-5G enabled device. In an exemplary embodiment where a printer is a non-5G enabled device, the system may receive an input that is a print job from a 5G enabled device such as a computer system and may redirect the print job to a specific printer specified in the input received from the 5G enabled device. In some embodiments, the system may receive the input that is not directed towards a specific non-5G enabled device. In such an embodiment, the system identifies the location of the 5G enabled device and identifies a non-5G enabled device that is located within the proximity of the 5G enabled device and routes the input to the non-5G enabled device that is located within the proximity of the 5G enabled device. In some embodiments, the system may consider other factors such as availability of paper, ink, number of pending jobs, or the like before routing the input.

FIG. 3 provides a process flow 300 for routing the input received from the at least one 5G enabled device to at least one non-5G enabled device, in accordance with embodiments of the present invention. Although this process flow is defined for routing the input received from the at least one 5G enabled device to at least one non-5G enabled device, it should be understood that the same process flow described in FIG. 2 and FIG. 3 may be applicable for routing inputs received from the at least one non-5G enabled device to the at least one 5G enabled device. The system of the present invention may perform purpose specific segmentation of the incoming requests from 5G enabled devices. The hybrid platform may allow outbound per-app session to public cloud while any session that is tagged or classified for local domain will enable peer-peer communication without allowing non-sanctioned inbound communication outside of the local domain. This will enable optimal data path and performance enabling hybrid system LAN architecture.

As shown in block 301, the system identifies a type of the input. The system may identify the type of the input based on determining the recipient of the input. The system identifies whether the input is an inbound communication or an outbound communication based on determining the recipient of the input. For example, the system may identify that the input received from a 5G-enabled device that is associated with an entity is to be transmitted to a non-5G enabled device that is associated with the same entity. The system may then identify such an input as an inbound communication.

As shown in block 302, the system determines that the input is for a local domain (i.e., inbound communication). As shown in block 303, the system in response to classifying the input as an inbound communication, route the input to the at least one non-5G enabled device. Routing the input to the at least one non-5G enabled device comprises transmitting data associated with the input to the at least one non-5G enabled device by enabling peer to peer communication between the at least one 5G enabled device and the at least one non-5G enabled device. As shown in block 304, the system determines that the input is not for the local domain (i.e., outbound communication). As shown in block 305, the system in response to classifying the input as an outbound communication, routes the input to a public cloud server. This classification and segmentation of the incoming inputs provides an optimal path for routing the incoming inputs, thereby increasing the efficiency of the communication process.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for enabling communication between 5G enabled devices and non-5G enabled devices, the system comprising:
  a memory device with computer-readable program code stored thereon;
  a communication device;
  a processing device operatively coupled to the memory device and the communication device, wherein the processing device is configured to execute the computer-readable program code to:
  establish a first connection with at least one 5G enabled device;
  establish a second connection with at least one non-5G enabled device;
  receive one or more inputs from the at least one 5G enabled device;

determine a type of each of the one or more inputs received from the at least one 5G enabled device; and
route the one or more inputs received from the at least one 5G enabled device to a recipient based on the type of the each of the one or more inputs, wherein the recipient is at least one of a third party device and the at least one non-5G enabled device.

2. The system of claim 1, wherein the processing device is further configured to execute the computer-readable program code to:
determine that the type of an input of the one or more inputs is an inbound communication based on determining the recipient of the input; and
route the input to the at least one non-5G enabled device.

3. The system of claim 2, wherein routing the input comprises transmitting data associated with the input to the at least one non-5G enabled device by enabling peer to peer communication between the at least one 5G enabled device and the at least one non-5G enabled device.

4. The system of claim 1, wherein the processing device is further configured to execute the computer-readable program code to:
determine that the type of an input of the one or more inputs is an outbound communication based on determining the recipient of the input; and
route the input to the third party device, wherein the third party device is a public cloud server.

5. The system of claim 1, wherein at least one input of the one or more inputs is associated with an action that is to be performed by the recipient.

6. The system of claim 1, wherein at least one input of the one or more inputs is associated with a data transfer job.

7. A method for enabling communication between 5G enabled devices and non-5G enabled devices, the method comprising:
establishing a first connection with at least one 5G enabled device;
establishing a second connection with at least one non-5G enabled device;
receiving one or more inputs from the at least one 5G enabled device;
determining a type of each of the one or more inputs received from the at least one 5G enabled device; and
routing the one or more inputs received from the at least one 5G enabled device to a recipient based on the type of the each of the one or more inputs, wherein the recipient is at least one of a third party device and the at least one non-5G enabled device.

8. The method of claim 7, wherein the method of routing the input further comprises:
determining that the type of an input of the one or more inputs is an inbound communication based on determining the recipient of the input; and
routing the input to the at least one non-5G enabled device.

9. The method if claim 8, wherein routing the input comprises transmitting data associated with the input to the at least one non-5G enabled device by enabling peer to peer communication between the at least one 5G enabled device and the at least one non-5G enabled device.

10. The method of claim 7, wherein routing the input further comprises:
determining that the type of an input of the one or more inputs is an outbound communication based on determining the recipient of the input; and
routing the input to the third party device, wherein the third party device is a public cloud server.

11. The method of claim 7, wherein at least one input of the one or more inputs is associated with an action that is to be performed by the recipient.

12. The method of claim 7, wherein at least one input of the one or more inputs is associated with a data transfer job.

13. A computer program product for enabling communication between 5G enabled devices and non-5G enabled devices, the computer program product comprising a non-transitory computer-readable storage medium having computer-executable instructions for:
establishing a first connection with at least one 5G enabled device;
establishing a second connection with at least one non-5G enabled device;
receiving one or more inputs from the at least one 5G enabled device;
determining a type of each of the one or more inputs received from the at least one 5G enabled device; and
routing the one or more inputs received from the at least one 5G enabled device to a recipient based on the type of the each of the one or more inputs,
wherein the recipient is at least one of a third party device and the at least one non-5G enabled device.

14. The computer program product of claim 13, wherein the computer program product comprises the non-transitory computer-readable storage medium having computer-executable instructions for:
determining that the type of an input of the one or more inputs is an inbound communication based on determining the recipient of the input; and
routing the input to the at least one non-5G enabled device.

15. The computer program product of claim 14, wherein routing the input comprises transmitting data associated with the input to the at least one non-5G enabled device by enabling peer to peer communication between the at least one 5G enabled device and the at least one non-5G enabled device.

16. The computer program product of claim 13, wherein the computer program product comprises the non-transitory computer-readable storage medium having computer-executable instructions for:
determining that the type of an input of the one or more inputs is an outbound communication based on determining the recipient of the input; and
routing the input to the third party device, wherein the third party device is a public cloud server.

17. The computer program product of claim 13, wherein at least one input of the one or more inputs is associated with an action that is to be performed by the recipient.

* * * * *